United States Patent [19]

Guenther

[11] Patent Number: 5,164,952
[45] Date of Patent: Nov. 17, 1992

[54] ELECTRICALLY PUMPED GAS LASER SUITABLE FOR HIGH INPUT POWER

[75] Inventor: Wolfgang Guenther, Munich, Fed. Rep. of Germany

[73] Assignee: Siemens Aktiengesellschaft, Munich, Fed. Rep. of Germany

[21] Appl. No.: 743,709

[22] Filed: Aug. 12, 1991

[30] Foreign Application Priority Data

Sep. 26, 1990 [DE] Fed. Rep. of Germany ....... 4030442

[51] Int. Cl.[5] .................................................. H01S 3/03
[52] U.S. Cl. .................................................... 372/61
[58] Field of Search ........................... 372/61, 81, 109

[56] References Cited

U.S. PATENT DOCUMENTS 4,752,937 6/1988 Gorisch et al. ...................... 372/61

4,939,738 7/1990 Opower ................................ 372/95

Primary Examiner—John D. Lee
Assistant Examiner—Robert E. Wise
Attorney, Agent, or Firm—Hill, Van Santen, Steadman & Simpson

[57] ABSTRACT

Electrically pumped gas laser suitable for high input power. In such an electrically pumped gas laser suitable for high input power, damage in the region of the vacuum bushing for feeding electrical power to an electrode that can arise as a consequence of the heating of the feeder during operation is avoided in that the feeder is fashioned as a tube and proceeds through an insulating busing and in that this tube is permeated by coolant. The invention is suitable for gas lasers, particularly slab or stripline lasers.

20 Claims, 2 Drawing Sheets

5,164,952

ELECTRICALLY PUMPED GAS LASER SUITABLE FOR HIGH INPUT POWER

BACKGROUND OF THE INVENTION

The present invention is directed to an electrically pumped gas laser that is suitable for high input power. Such a gas laser is disclosed by German Published Application 37 29 053 (corresponding to U.S. Pat. No. 4,939,738). When such a prior art laser is used in high power ranges, prior art vacuum bushings are no longer adequate, given the required dimensions, in order to remain vacuum-tight over a long time period and in order to retain adequate electric strength. As a result, the laser is damaged or destroyed as a consequence of the heating of the leads and the local expansion in the region of the bushing connected therewith.

SUMMARY OF THE INVENTION

It is an object of the present invention to provide in a suitable structure a gas laser having a vacuum-tight housing and two electrodes whereof at least one electrode is electrically insulated vis-a-vis the housing. A feeder is provided for supplying electrical energy and is conducted in an electrically insulated and vacuum-tight manner through the housing wall. The gas laser of the present invention is also suitable for use in the upper power range. The object of the present invention is achieved by the feeder being fashioned as a tube, the insulation vis-a-vis the housing being formed by an insulating bushing for this tube, and the tube being traversed by coolant. Water-cooled bushings provide a relatively simple structure wherein the tube is directly guided through an insulator that in turn terminates the housing vacuum-tight.

It is thereby advantageous that when an electrode that does not lie at grounded potential be cooled via cooling coils and that the electrical lead forms a coolant delivery or discharge for this electrode in cooperation with a correspondingly constructed coolant discharge or delivery. Especially low losses are achieved in that the coolant delivery and the coolant discharge are electrically conductive and connected to a common voltage feed. A miniaturization of the structure and the elimination of a coolant delivery is enabled in that only a common coolant delivery and a common coolant discharge are provided for two oppositely polarized electrodes, in that the coolant delivery is electrically conductively connected to a first electrode and the coolant discharge is electrically conductively connected to a second, oppositely polarized electrode, in that a connecting line for the coolant is arranged between the two electrodes, in that an electrically insulating distance is provided in the region of the connecting line, and in that the coolant delivery or the coolant discharge serves as an electrical lead.

When the laser is to be operated at high frequencies, then an embodiment is advantageous wherein the housing is composed of an HF-tight (high frequency tight) and vacuum-tight laser space and of a HF-tight antechamber, in that the coolant delivery and the coolant discharge are conducted from the laser space into the antechamber, in that the coolant delivery or, respectively, coolant discharge belonging to the electrode that carries voltage vis-a-vis ground is electrically conductive and connected in the antechamber to a feed for the high-frequency, and in that the coolant is supplied to the coolant discharge and to the coolant delivery via electrically insulating coolant lines that are situated in the antechamber and are dimensioned adequately long enough to avoid electrical arc-overs.

This structure provides a high-frequency-tight feed of coolant and electrical energy. All weak points with respect to high-frequency tightness are well-protected in the antechamber.

Advantageously, a matching unit is accommodated in the antechamber, this matching unit matching the impedance of an external high frequency line or, respectively, of a high frequency generator to the impedance of the laser. Further possibilities of emitting high-frequency are thereby suppressed.

Water has particularly proven to be useable as the coolant and to provide adequate insulation.

An especially advantageous high frequency insulation is established in that the electrically non-conductive coolant lines are adequately long in order to avoid electrical arc-overs and are still connected to electrically conductive coolant connections in the antechamber, and in that the coolant connections lie at ground and lead out of the antechamber. This is advantageous when the antechamber has metal walls, and when the coolant connections are formed of metal tubes that pass through a metal wall and are soldered or welded thereto.

An advantageous embodiment of the present invention has the features that the laser space is limited on all sides by metal walls and has an end wall into which an opening is introduced, that a metal tube having an inside diameter that is larger than the coolant lines is introduced into this opening, that this metal tube projects into the antechamber and is closed vacuum-tight therein by a ceramic wafer through which proceed the coolant delivery and coolant discharge and that the ceramic wafer is designed as an insulator for the applied high frequency voltage. For avoiding thermal stresses, the coolant delivery or, respectively, coolant discharge being at high frequencies is advantageously formed of a thin-walled metal tube at least in the region of the ceramic wafer and is electrically conductive and connected to a feed for the high-frequency via a clamp means in the antechamber close to the ceramic wafer, whereby the feed for the high-frequency is supported by the clamp means and connects to the impedance matching unit. The laser of the present invention is advantageously a slab or stripline laser having an unstable optical resonator. Such lasers are intended to combine high powers with small dimensions; the problems of supplying the power arise clearly therein.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
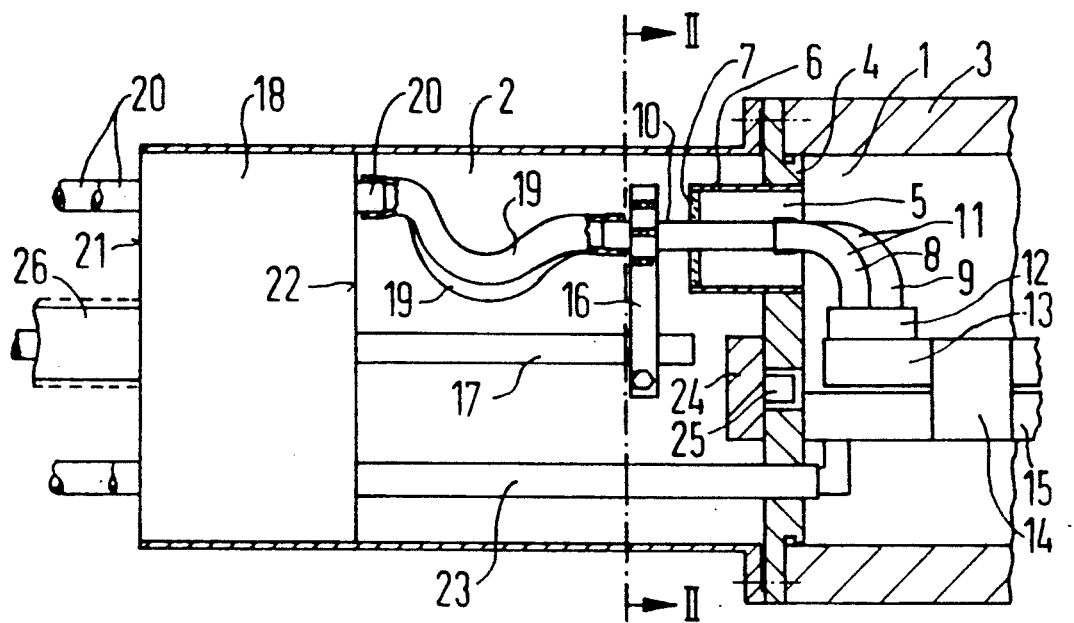
FIGS. 1 and 3 are cross-sectional views depicting lasers of the present invention.
Figure 2:
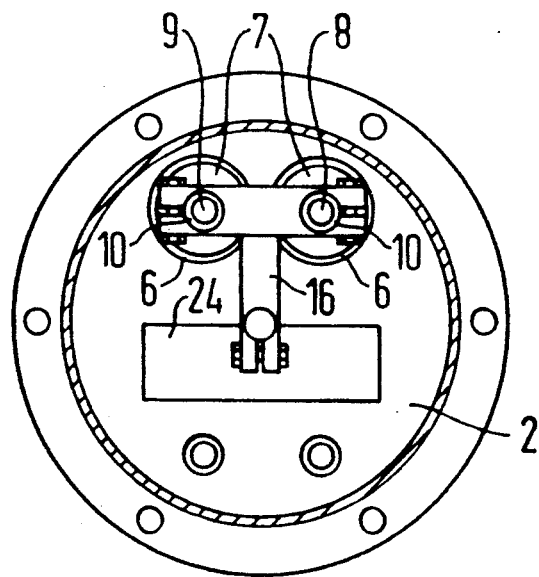
FIGS. 2 and 4 are section views of the lasers depicted in FIG. 1 and FIG. 3, respectively.

A housing of an electrically pumped gas laser is composed of a laser space 1 and of an antechamber 2. The laser space 1 is limited on all sides by metal walls. An end wall 4 is attached to an outside wall 3. The end wall 4 contains two recesses 5 into which bushing tubes 6 of metal are introduced. The bushing tubes 6 project into the antechamber 2 and are each respectively terminated outside the end wall 4 by a respective ceramic wafer 7. A tube section 10 of the coolant delivery 8 or, respectively, discharge 9 passes through the ceramic wafer 7, whereby the tube piece 10 merges into a tube arc 11 that discharges into a connector member 12 of an electrode 13 that is insulated from the housing. The electrode 13 is connected via insulating spacers 14 to an electrode 15 that lies at ground potential.

The tube pieces 10 are clamped in a common, electrically conductive clamp means 16. The clamp means 16 is electrically conductive and connected to a high frequency feeder 17, whereby the high frequency feeder 17 is connected to a matching unit 18.

The coolant delivery 8 and the coolant discharge 9 are connected to coolant connections 20 via electrically insulating coolant lines 19, whereby the length of the coolant lines 19 is dimensioned to be long enough to avoid arc-overs of the high-frequency and, for example, proceed in an arc. Experience has shown that a length of approximately 10 cm is adequate for this purpose. The coolant connections 20 proceed through the end wall 22 of the matching unit 18 and through the matching unit 18, and are soldered or welded to the end wall 21 of the antechamber 2. This arrangement guarantees a reliable high-frequency shielding from with little outlay.

The coolant delivery and discharge for the electrode 15 lying at ground can be executed as metal tubes and can likewise be conducted to the outside through the matching unit and through the end wall of the antechamber.

The antechamber 2 only has to be terminated in a high-frequency-tight means; a vacuum-tight housing is not required. By contrast thereto, the laser space 1 is designed vacuum-tight. The structure of the present invention thereby enables the employment of aluminum for the walls of the laser space. The bushing tube 6 is advantageously composed of a metal, for example "Vacon", that is adapted to the coefficient of thermal expansion of the ceramic wafer 7. The bushing tube 6 is thereby fashioned relatively thin-walled, so that it deforms as a consequence of temperature changes given mechanical stresses and thus guarantees the vacuum-tight connection between the substances having different coefficients of thermal expansion. Mirror mounts 24 having laser mirrors 25, of which only one is shown in FIG. 1, supplement the laser. A high-frequency feeder 26 in the form of a shielded cable is connected in the region of the end wall 22.

Figure 3:
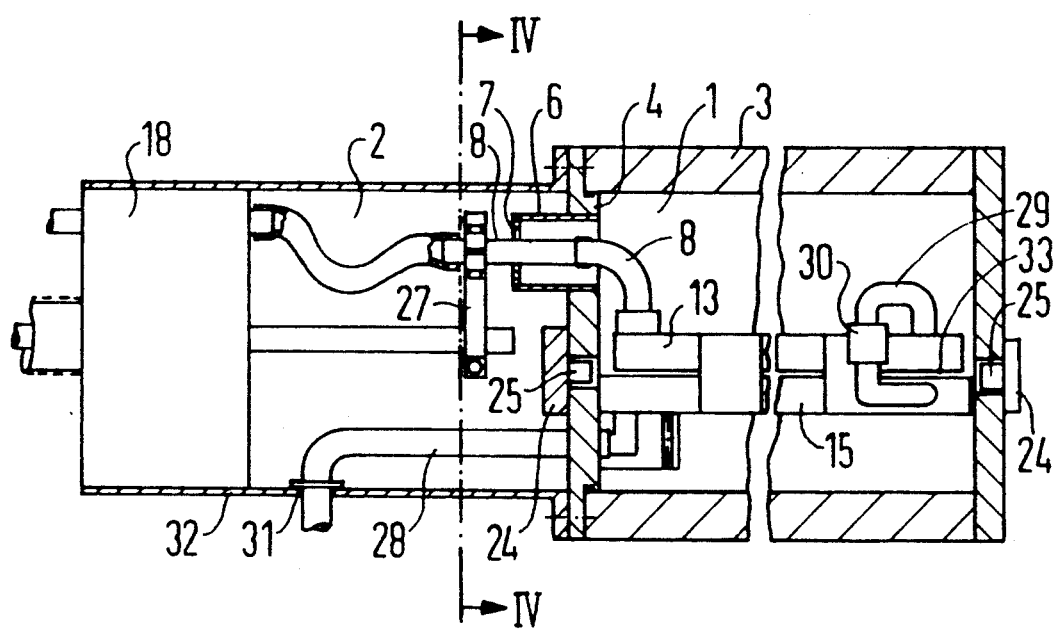
Figure 4:
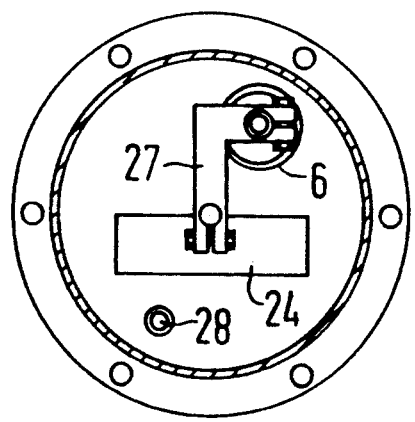

Only one coolant delivery 8 and one coolant discharge 28 are provided in the embodiment depicted in FIGS. 3 and 4, whereby the coolant delivery 8 also serves as feeder for the high-frequency. Accordingly, the clamp means 27 serving the purpose of high frequency feed is angularly executed and the T-shaped embodiment of FIG. 1 is not required. The coolant passes through cooling channels (not shown) of the electrode 13 that is insulated from ground and then flows through the connecting line 29 having an insulating distance 30 and into the electrode 15 lying at ground and is carried off toward the outside via a coolant discharge 28. The coolant discharge 28 is connected vacuum-tight to the end wall 4 of the laser space 1 and terminates the antechamber 2 only high frequency tight at a lead-through location 31. In this example, the lead-through location 31 is located in the cylindrical jacket 32 of the antechamber 2. As in the example of FIG. 1, it can also proceed through the matching unit 18. Laser mirrors 25 are brought optimally close to the discharge gap 33 of the stripline laser shown in FIG. 3. They are essentially seated in the housing wall and therefore permit a small dimensioning of the laser space.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. An electrically pumped gas laser suitable for high input power, having a vacuum-tight housing and two electrodes whereof at least one electrode is electrically insulated relative to the housing, an electrical feeder being provided for delivering electrical energy to the at least one electrode, the electrical feeder being conducted through a wall of the housing in an electrically insulated and vacuum-tight manner, comprising: the electrical feeder being an electrically conductive tube; an insulating bushing for electrically insulating the tube relative to the housing; and the tube carrying a coolant.

2. The gas laser according to claim 1, wherein the at least one electrode that is insulated relative to the housing is cooled via cooling channels; and wherein the electrical feeder forms a coolant delivery for the at least one electrode; and wherein the gas laser further comprises a correspondingly constructed coolant discharge.

3. The gas laser according to claim 2, wherein the housing is composed of a high-frequency-tight and vacuum-tight laser space and of a high-frequency-tight antechamber that precedes said laser space in the direction of the laser beam; wherein the coolant delivery and the coolant discharge are conducted out of the laser space and into the antechamber; and wherein the coolant delivery or, respectively, coolant discharge that carries voltage vis-a-vis ground is connected to a corresponding electrical terminal in the antechamber, electrically non-conductive coolant lines for the coolant delivery or, respectively, discharge that are electrically insulating in the antechamber being connected to the coolant discharge or, respectively, delivery.

4. The gas laser according to claim 3, wherein the gas laser further comprises a matching unit in the antechamber, said matching unit matching the impedance of an external high-frequency line or, respectively, of a high frequency generator to the impedance of the laser.

5. The gas laser according to claim 4, wherein the matching unit is separated by a metal partition from a remaining area of the antechamber; and wherein the coolant connections are conducted high-frequency-tight through the metal partition.

6. The gas laser according to claim 3, wherein the electrically non-conductive coolant lines are sufficiently long enough to avoid electrical punctures and are connected to electrically conductive coolant connections in the antechamber; wherein the coolant connections lie at ground and lead out of the antechamber.

7. The gas laser according to claim 6, wherein the antechamber has a metal wall; wherein the coolant connections are metal tubes that pass through the metal wall and are soldered or welded thereto.

8. The gas laser according to claim 1, wherein the coolant is water.

9. The gas laser according to claim 1, wherein the laser is a slab or stripline laser having an unstable optical resonator.

10. An electrically pumped gas laser suitable for high input power, having a vacuum-tight housing and two electrodes whereof at least one electrode is electrically insulated relative to the housing, an electrical feeder being provided for delivering electrical energy to the at least one electrode, the electrical feeder being conducted through a wall of the housing in an electrically insulated and vacuum-tight manner, comprising: the electrical feeder being an electrically conductive tube; an insulating bushing for electrically insulating the tube relative to the housing; the tube carrying a coolant; the at least one electrode that is insulated relative to the housing being cooled via cooling channels; the electrical feeder forming a coolant delivery for the at least one electrode; a correspondingly constructed coolant discharge; and the coolant delivery and the coolant discharge being both electrically conductive and being both connected to the electrical feeder.

11. An electrically pumped gas laser suitable for high input power, having a vacuum-tight housing and two electrodes whereof at least one electrode is electrically insulated relative to the housing, an electrical feeder being provided for delivering electrical energy to the at least one electrode, the electrical feeder being conducted through a wall of the housing in an electrically insulated and vacuum-tight manner, comprising: the electrical feeder being an electrically conductive tube; an insulating bushing for electrically insulating the tube relative to the housing; the tube carrying a coolant; the at least one electrode that is insulated relative to the housing being cooled via cooling channels; the electrical feeder forming a coolant delivery for the at least one electrode; a correspondingly constructed coolant discharge; a command coolant delivery and a common coolant discharge being provided for the two electrodes, the two electrodes being oppositely polarized; the coolant delivery being electrically conductive and connected to a first electrode of the two electrodes and the coolant discharge being electrically conductive and connected to a second electrode of the two electrodes; a connecting line for carrying the coolant being located between the two electrodes; an electrically insulating distance being provided in the region of the connecting line; and one of the coolant delivery and the coolant discharge being the electrical feeder.

12. An electrically pumped gas laser suitable for high input power, having a vacuum-tight housing and two electrodes whereof at least one electrode is electrically insulated relative to the housing, an electrical feeder being provided for delivering electrical energy to the at least one electrode, the electrical feeder being conducted through a wall of the housing in an electrically insulated and vacuum-tight manner, comprising: the electrical feeder being an electrically conductive tube; an insulating bushing for electrically insulating the tube relative to the housing; the tube carrying a coolant; the laser space being defined by metal walls on all sides and having an end wall into which at least one recess is introduced; at least one metal bushing tube having an inside diameter that is larger than the coolant lines being located int he recess; the bushing tube projecting into the antechamber and being sealed vacuum-tight therein with a ceramic wafer through which at least one of a coolant delivery and coolant discharge proceeds; and the ceramic wafer being an insulator for high frequency voltage.

13. The gas laser according to claim 12, wherein the one of the coolant delivery and coolant discharge lying at high-frequency is a thin-walled metal tube at least in the region of the ceramic wafer and is electrically conductive and connected to a feeder for the high-frequency via a clamp means in the antechamber in the proximity of the ceramic wafer; wherein the clamp means supports the feeder for the high frequency; and wherein the feeder for the high-frequency connects to a matching unit for impedance matching.

14. An electrically pumped gas laser suitable for high input power, having a vacuum-tight housing and two electrodes whereof at least one electrode is electrically insulated relative to the housing, an electrical feeder being provided for delivering electrical energy to the at least one electrode, the electrical feeder being conducted through a wall of the housing in an electrically insulated and vacuum-tight manner, comprising: the electrical feeder being a tube; an insulating bushing for electrically insulating the tube relative to the housing; and the tube carrying a coolant; the at least one electrode that is insulated relative to the housing being cooled via cooling channels and the electrical feeder being a coolant delivery for the at least one electrode; a correspondingly constructed coolant discharge for the at least one electrode; the housing composed of a high-frequency-tight and vacuum-tight laser space and of a high-frequency-tight antechamber that precedes said laser space in the direction of the laser beam; the coolant delivery and coolant discharge conducted out of the laser space and into the antechamber; the coolant delivery or, respectively, coolant discharge that carries voltage vis-a-vis ground connected to a corresponding electrical terminal in the antechamber; and electrically non-conductive coolant lines for the coolant delivery or, respectively, discharge that are electrically insulating in the antechamber connected to the coolant discharge or, respectively, delivery.

15. The gas laser according to claim 14, wherein the coolant delivery and the coolant discharge are both electrically conductive and are both connected to the electrical feeder.

16. The gas laser according to claim 14, wherein only a common coolant delivery and a common coolant discharge are provided for the two electrodes, the two electrodes being oppositely polarized; wherein the coolant delivery is electrically conductive and connected to a first electrode of the two electrodes and the coolant discharge is electrically conductive and connected to a second electrode of the two electrodes; wherein a connecting line for carrying the coolant is located between the two electrodes; wherein an electrically insulating distance is provided in the region of the connecting line; and wherein one of the coolant delivery and the coolant discharge is the electrical feeder.

17. The gas laser according to claim 14, wherein the electrically non-conductive coolant lines are sufficiently long enough to avoid electrical punctures and are connected to electrically conductive coolant connections in the antechamber; wherein the coolant connections lie at ground and lead out of the antechamber.

18. The gas laser according to claim 17, wherein the antechamber has a metal wall; wherein the coolant connections are metal tubes that pass through the metal wall and are soldered or welded thereto.

19. An electrically pumped gas laser suitable for high input power, having a vacuum-tight housing and two electrodes whereof at least one electrode is electrically insulated relative to the housing, an electrical feeder being provided for delivering electrical energy to the at least one electrode, the electrical feeder being conducted through a wall of the housing in an electrically insulated and vacuum-tight manner, comprising: the electrical feeder being a tube; an insulating bushing for electrically insulating the tube relative to the housing; and the tube carrying a coolant; the at least one electrode that is insulated relative to the housing being cooled via cooling channels and the electrical feeder being a coolant delivery for the at least one electrode; a correspondingly constructed coolant discharge for the at least one electrode; the housing composed of a high-frequency-tight and vacuum-tight laser space and of a high-frequency-tight antechamber that precedes said laser space in the direction of the laser beam; the coolant delivery and the coolant discharge conducted out of the laser space and into the antechamber; the laser space defined by metal walls on all sides and being an end wall into which at least one recess is introduced; at least one metal bushing tube having an inside diameter that is larger than the coolant lines located in the recess; the bushing tube projecting into the antechamber and sealed vacuum-tight therein with a ceramic wafer through which at least one of the coolant delivery and coolant discharge proceeds, the ceramic wafer being an insulator for high frequency voltage; the coolant delivery or, respectively, coolant discharge that carries voltage vis-a-vis ground connected to a corresponding electrical terminal in the antechamber; electrically non-conductive coolant lines for the coolant delivery or, respectively, discharge that are electrically insulating in the antechamber connected to the coolant discharge or, respectively, delivery; and the one of the coolant delivery and coolant discharge lying at high-frequency being a thin-walled metal tube at least in the region of the ceramic wafer and electrically conductive and connected to a feeder for the high-frequency via a clamp means in the antechamber in the proximity of the ceramic wafer, the clamp means supporting the feeder for the high frequency, and the feeder for the high-frequency connected to a matching unit for impedance matching.

20. The gas laser according to claim 19, wherein the electrically non-conductive coolant lines are sufficiently long enough to avoid electrical punctures and are connected to electrically conductive coolant connections in the antechamber; wherein the coolant connections lie at ground and lead out of the antechamber; the antechamber has a metal wall; wherein the coolant connections are metal tubes that pass through the metal wall and are soldered or welded thereto; and the matching unit is separated by a metal partition from a remaining area of the antechamber; and wherein the coolant connections are conducted high-frequency-tight through the metal partition.

* * * * *